July 13, 1926.
H. C. NYE
1,592,617
BORING MECHANISM
Filed Nov. 16, 1925
2 Sheets-Sheet 1
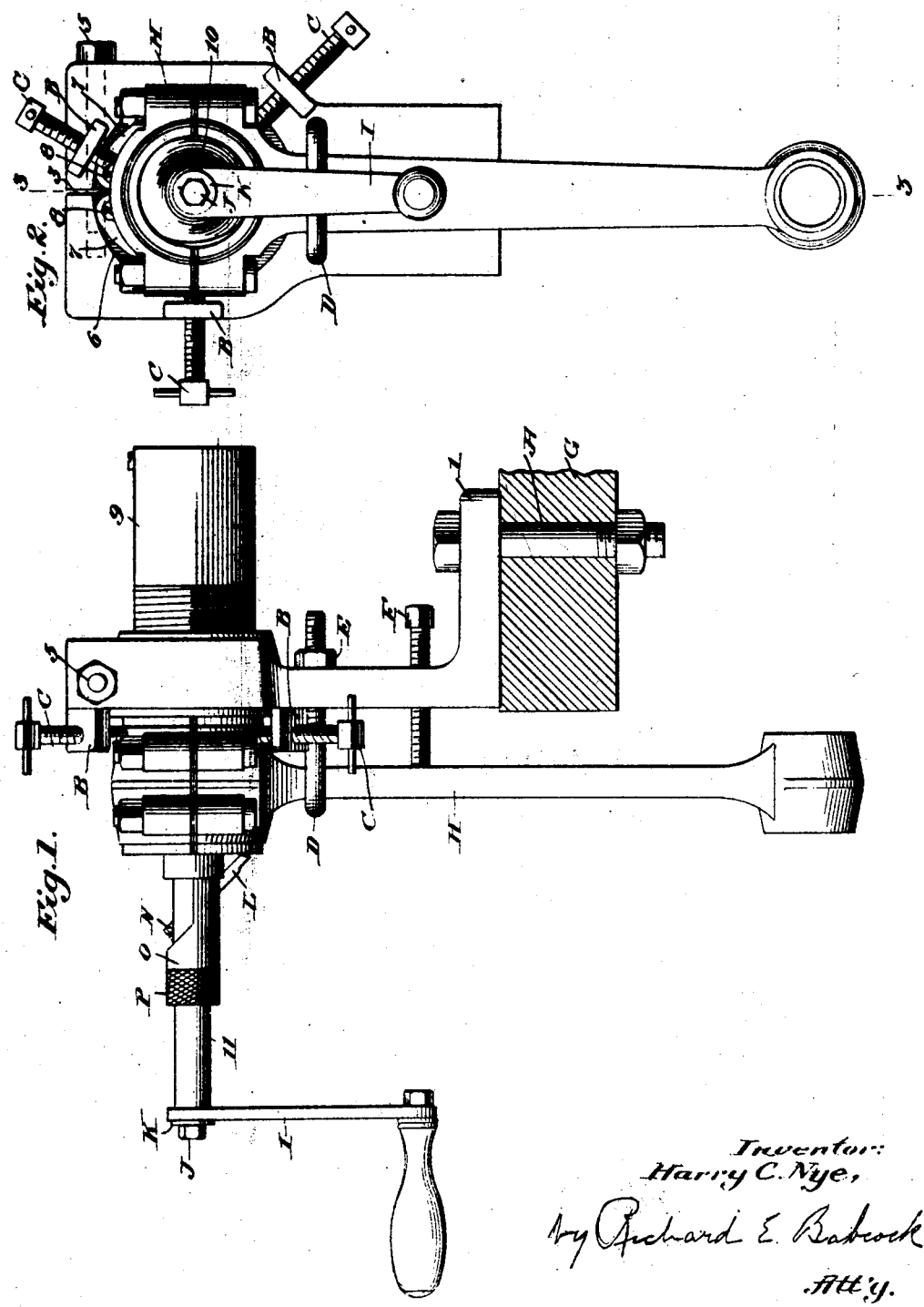
Inventor:
Harry C. Nye,
by Richard E. Babcock
Att'y.

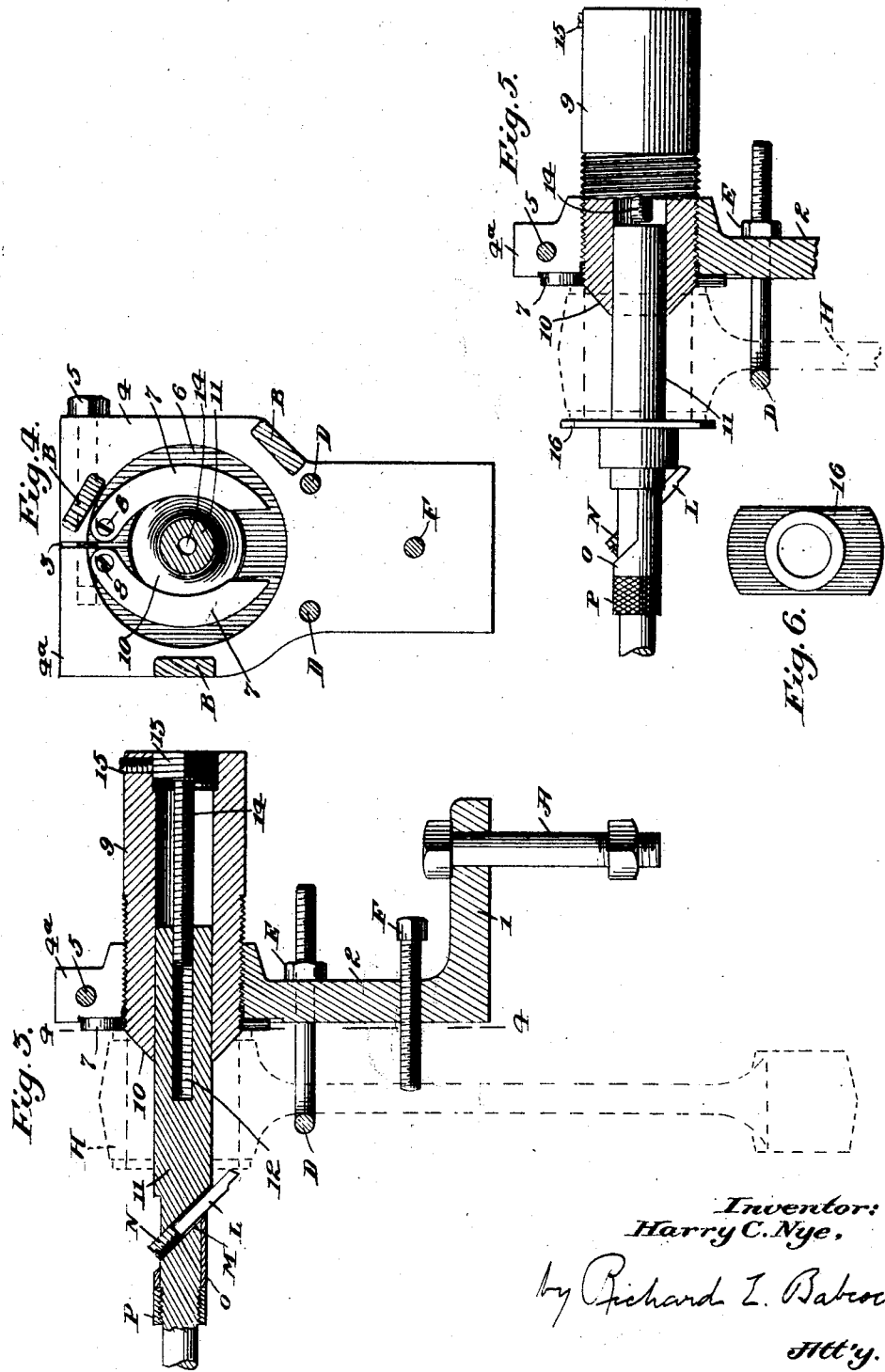

Patented July 13, 1926.

1,592,617

UNITED STATES PATENT OFFICE.

HARRY C. NYE, OF LITITZ, PENNSYLVANIA.

BORING MECHANISM.

Application filed November 16, 1925. Serial No. 69,331.

This invention relates to a device or machine, and parts thereof, for boring connecting rod bearings more particularly and also other similar bearings, and is primarily intended for use in automobile repair and assembling shops.

Its primary purposes are to provide in a machine for boring out the surplus metal of the connecting rod bearings, a combination of elements whereby connecting rods having a wide range of sizes of bearings will be held firmly against an adjustable support or abutment device to prevent possible rocking or axial misalignment while also held firmly centered with relation to the cutter and other parts against radial displacement; to provide swinging abutment plates for accommodating a wide range of different sizes of bearings; to provide a combination of elements whereby full free vision is had of the inner face of the bearing while it is being bored by the operator while turning the cutter shaft or rod; to provide an adjustable work centering, cutter feeding, and cuttershaft or rod bearing supporting and centering device; to provide simple quickly operated means for effectually locking the latter device in adjusted position; to provide easy, quick and sure means for holding the connecting rod against rocking movement; to provide easy, quick and certain means of determining if the bearing is in perpendicular relation to its support or abutment plates; and to greatly simplify the construction, operation and cost of manufacture and maintenance of such devices or machines, all of which objects are accomplished by the construction hereinafter more particularly set forth, described and claimed.

Only the preferred form is shown in the accompanying drawings to illustrate the practice of the invention as by law required, but it is obvious that various modifications and detail changes may be made without departing from the invention.

In the accompanying drawings:

Figure 1 represents a side elevation of a device or machine embodying my invention with a connecting rod held in place therein to be operated upon, the machine being held or clamped to a suitable work bench or other support, shown in section and broken away, by bolts or any other suitable means;

Figure 2, a front elevation of the machine with a connecting rod held in place therein;

Figure 3, a section on line 3—3 of Fig. 2, the connecting rod being indicated in dotted lines;

Figure 4, a section on the line 4—4 of Fig. 3, the tapering cone face 10 of the sleeve 9 being shown in front elevation;

Figure 5, a detail fragmentary view, partly in side elevation and partly in section, to illustrate the manner of use of the testing plate or trying out plate and to show the relative position of the parts during such testing; and Figure 6, a front elevation of the testing or trying out plate.

Referring now in detail to the drawings, the frame comprises a short arm 1, to be clamped preferably in a horizontal position to a work bench or other support G by a plurality of bolts A or other suitable means, and an arm 2, which may be, as illustrated, integral with and extending at right angles from, arm 1, and have its upper end portion formed with a large internally screw-threaded bore and centrally split, as at 3, radially of said bore from the upper end of said arm 2 to said bore, thereby forming two opposed jaws 4ª and 4 surrounding the said bore, said jaws being bored at right angles to the axis of said large bore to receive a clamping stud screw or bolt 5 which engages with internal threads in the bore of jaw 4ª and bears with its head against jaw 4 to draw said jaws together to clamp on sleeve 9, or, on being screwed out, permits the said jaws to spring apart to permit the sleeve 9 to be turned in said large bore.

The upper portion of arm 2 is also provided with a plurality, three being shown, of bored ears or lugs B preferably equidistantly spaced about the axis of said large bore to receive centering screws C to bear against the work preferably radially thereof, and the lower portion of said arm 2 is provided in a horizontal plane with two perforations to receive the legs respectively of a bridle D, the end portions of the legs of which are screw-threaded to receive nuts E, and, in a lower horizontal plane, with a single perforation to receive an adjusting thrust screw F, the axis of which is preferably parallel to, and equi-distant from, the axes of the legs of said bridle D, in operation the bridle D straddling the connecting rod H and drawing it toward the arm 2 as the nuts E are tightened up and the screw F engaging the said connecting rod H and forcing it away from said arm 2, these two elements, the bridle D and thrust screw F, being so adjusted that their combined action holds the connecting rod tightly and firmly in parallel relation to the arm 2.

The face of the upper portion of the arm 2 and the jaws 4 and 4ª thereof is slightly countersunk, as shown in the drawings, as at 6, adjacent to the large screw-threaded bore or throat therein, the vertical face of such countersink being smoothed and dressed to give a true flat smooth vertical surface, and a pair of abutment plates 7 are pivotally connected respectively to the respective jaws 4 and 4ª by their respective screws 8 at the respective upper ends of said abutment plates so as to depend therefrom and to swing under the action of gravity toward each other across the said throat or large bore, being so mounted as to swing in the same vertical plane and to be in sliding contact with the smooth vertical wall of said countersink 6, and may be limited in their outward movement by the horizontally extending wall of said countersink. However, the main purpose of the countersink is to obtain a smooth and true vertical surface for the abutment plates 7, and the countersink itself is not, therefore, essential; nor is it essential that there should be any means for limiting the outward movement of said abutment plates 7.

The abutment plates are made with exactitude and are uniform throughout in all dimensions so as to provide a true face perpendicular to the end of the bearing to be bored, or other work, and at right angles to the axis of said bearing and the axis of the cutter shaft or rod. Of course said abutment plates 7 will preferably be made in quantity production and so as to be interchangeable.

A cylindrical heavy thick cast, forged, or bored metal sleeve 9 having a tapering conical positioning or centering end face 10 and an externally screw-threaded portion extending rearwardly therefrom screws into the large screw-threaded bore or throat, above mentioned, in the upper portion of the arm 2 and serves as a centering device for the work and the abutment plates 7, and as a bearing, guide, and support for the cutter shaft or rod 11, which is centrally axially bored at 12, as shown in Fig. 3, and the rear end of said sleeve 9 is axially countersunk and threaded to receive the screw-plug 13 having a long integral externally screw-threaded stem 14 extending centrally and axially of said sleeve 9, a lock-screw 15 extending through the rear portion of the wall of sleeve 9 and engaging plug 13 to hold it locked in position. However, it is not essential that these elements 9, 13 and 14 be made separate and assembled; they may be made as one integral piece; and the sleeve 9, stem 14 and the bore 11 may be appreciably longer in proportion to the other elements or to the externally screw-threaded portion of sleeve 9 than shown.

The cutter rod or shaft 11 makes a tight fit or close fit in the bore of sleeve 9 so that its axis will be held in alignment with the axis of said sleeve, and the screw-thread of its wall engages with the thread of the stem 14 to feed the said rod or shaft 11 and its knife L progressively through the bearing being bored as the shaft or rod 11 is rotated by the crank I secured thereto by the stud-screw or bolt J and washer K.

The knife or cutter tool L may be of any usual and suitable design, material and construction and mounted, held and adjusted in any suitable manner. It is shown in the drawings as mounted in an inclined transverse bore M in the shaft or rod 11, an adjusting screw N engaging in threads in a portion of the wall of bore M serving to adjust said tool, and a clamping sleeve O and screw-threaded ring or collar P engaging with threads on a reduced portion of said rod 11 serving to clamp the tool or cutter L at will in adjusted position in accordance with usual practice.

Of course, lock nuts or other locking means may be provided on or for the legs of bridle D, the thrust-screw F, and the centering screws C.

In operation, the bridle D being loosened or removed, and the thrust screw F and sleeve 9 being retracted, a connecting rod H will be placed against the face of arm 2 of the frame, the bridle D arranged straddling the same with its legs extending through their respective bores or perforations in arm 2 and having the nuts E respectively applied to said legs.

The bearing portion of the connecting rod H will then be held against the abutment plates 7 so as to be perpendicular thereto and the sleeve 9 will be screwed in until its conical face 10 is in engagement at all points with the adjacent end edge of the bearing, the abutment plates 7 being spread as required by said conical face 10 of the sleeve 9 as the latter is screwed in.

With the work properly centered and it and the parts in position as above, the bridle D and thrust screw F are tightened up to hold the connecting rod against any rocking motion that would result in axial misalignment of the work, such tightening up holding the work firmly and squarely against the abutment plates 7, and the centering screws C are turned in to engage the work at three or more points about its axis to prevent any radial displacement of the work.

The testing or trying out plate 16 is then slipped over the inner or rear bored end of the cutter bar or shaft 11, which is then inserted through the bearing in the bore of sleeve 9 and the testing plate then shoved against the outer end of the work to see if it fits squarely against the work. If so, the sleeve 9 is backed out several turns to allow working room for the cutter or tool in the latter part of the boring operation, and then the stud bolt or screw 5 is turned to draw the jaws 4 and 4ª together to firmly clamp the sleeve 9 between them and lock it against any movement relative to the arm 2.

The cutter rod or shaft 11 is then removed, the testing or trying out plate 16 removed therefrom, the rod or shaft 11 reinserted through the work into sleeve 9 and shoved lengthwise thereof until in engagement with the stem 14, and is then rotated in the correct direction so that the threads of the stem 14 will engage in the thread in the wall of bore 12 and will gradually feed the cutter rod 11 and its cutter or tool lengthwise through the work as the shaft 11 is rotated to bore the bearing with the cutter L. During the boring operation the mechanic at all times has complete free vision of the progress of the boring operation from his position in turning the crank I. When the boring operation is finished, reverse rotation of the cutter rod or shaft 11 will serve to feed it in the reverse direction until disengaged from the stem 14, when it may be pulled lengthwise from the sleeve 9 and the work and the latter may be removed, as finished, from the machine or device.

Having thus described my invention, what I claim as new and desire to secure by Letters Patent is:

1. In a boring mechanism, a frame having a split portion formed with a large screw-threaded bore, means for clamping an element to be bored to said frame in desired position, and a plurality of abutment plates mounted on said frame to move across said bore to provide an adjustable backing for different sizes of parts to be bored, in combination with a bearing element, externally screw-threaded to engage the threads in said bore, having its operative end conical in shape to act as a centering means for said element to be bored and as a spreading means for said abutment plates, and being centrally bored concentric with its axis and being provided with a rigid relatively immovable screw-threaded stem extending internally of said bearing part axially thereof from the rear toward the conical end thereof and equi-distantly spaced at all points from the wall of the bore thereof, a cutter rod, a cutter tool carried by said rod, a crank depending from the front end of said rod, the rear end portion of said rod being formed with a central axially extending screw-threaded bore and being of such external diameter as to fit tightly in said bore in said bearing element, and said stem being adapted to engage with its thread the screw-thread in said cutter rod to feed the latter endwise with relation to said bearing element as said rod is rotated, and means for clamping said bearing element against movement.

2. In a boring mechanism, a frame having a split portion formed with a large screw-threaded bore, and means for clamping a work piece to be bored to said frame in desired position, in combination with a bearing element, externally screw-threaded to engage the threads in said bore, having its operative end conical in shape to act as a centering means for the work piece, being centrally bored concentric with its axis, and being provided with a rigid relatively immovable screw-threaded stem extending internally of said bearing element axially thereof from the rear toward the conical end thereof and equi-distantly spaced at all points from the wall of the bore thereof, a cutter rod, a cutter tool carried by said rod, an operating means extending from the front portion of said rod, and means for clamping said bearing element against axial, and against rotary, movement, the rear end portion of said rod being formed with a central axially extending screw-threaded bore, and being of such external diameter as to fit tightly in said bore in said bearing element, and said stem being adapted to engage with its thread the thread in said cutter rod to feed the latter endwise with relation to said bearing part as said rod is rotated.

3. In a boring mechanism, a frame having a portion formed with a throat, means for clamping a work piece to said frame in desired position, and a plurality of abutment plates mounted on said frame to move across said throat to provide an adjustable backing for different sizes of work pieces, in combination with a bearing element fitting in said throat and adapted to be moved endwise therein with relation to said frame and to be locked in said throat against movement relative to said frame, and having its operative end conical in shape to act as a centering means for the work piece and as a spreading means for said abutment plates, and being centrally bored concentric with its axis and provided with a rigid relatively immovable externally screw-threaded stem extending internally of said bearing element axially thereof from the rear toward the conical end thereof and concentric with the wall of the bore thereof, a cutter rod, a cutter tool carried by said rod, operating means extending from the front portion of said rod, and means for locking said bearing element in said throat against movement relative to said frame, the rear portion of said rod being formed with a central axially extending screw-threaded bore and being of such external diameter as to fit tightly in the bore of said bearing element, and said stem being adapted to engage with its thread the thread in said cutter rod to feed the latter endwise with relation to said bearing element as said rod is rotated.

4. In a boring mechanism, a frame having a portion formed with a throat, and means for clamping a work piece to said frame in desired position, in combination with a bearing element fitting in said throat and adapted to be adjusted axially thereof, and having its operative end conical in shape to act as a centering means for the work piece, and being centrally axially bored and provided with a rigid relatively immovable externally screw-threaded stem extending from the rear toward the conical end of said bearing element and concentric with the wall of the bore thereof a cutter rod, a cutter tool carried by said rod, and means for locking said bearing element in adjusted position in said throat, the rear portion of said rod being formed with a central exially extending screw-threaded bore and being of such external diameter as to fit tightly in the bore of said bearing element, and said stem being adapted to engage with its thread the thread in said cutter rod to feed the latter endwise of said bearing element as said rod is rotated.

5. In a boring mechanism, a frame having a portion formed with a throat, and means for clamping a work piece to said frame in desired position, in combination with a bearing element fitting in said throat and adapted to be adjusted exially thereof, and being centrally axially bored and provided with a rigid relatively immovable externally screw-threaded stem extending from the rear thereof toward the front end thereof and concentric with the wall of the bore thereof, a cutter rod, a cutter tool carried by said rod, and means for locking said bearing element in adjusted position in said throat, the rear portion of said rod being formed with a central axially extending screw-threaded bore and being of such external diameter as to fit tightly in the bore of said bearing element, and said steam being adapted to engage with its thread the thread in said cutter rod to feed the latter endwise of said bearing element as said rod is rotated.

6. In a boring mechanism, a frame having a portion formed with a throat, and boring means, in combination with adjustable abutment plates mounted on said frame and adapted to adjustably extend across said throat to afford a backing for varying sizes of work pieces, and a bearing element axially adjustable in said throat and solely supporting said boring means in correct axial alignment, said bearing element having an operative face for correctly centering a particular work piece and for spreading the said abutment plates as required, and said bearing element and said boring means being provided with cooperating interengaging means for moving said boring means endwise of said bearing element as said boring means is rotated.

7. In a boring mechanism, a frame having a portion formed with a throat, and boring means, in combination with a bearing element axially adjustable in said throat and solely supporting said boring means in correct axial alignment, said bearing element having an operative face for correctly centering a particular work piece, and said bearing element and said boring means being provided with cooperating means for moving said boring means axially of said bearing element as said boring means is rotated.

8. In a boring mechanism, a frame having a throat, and boring means, in combination with a bearing element axially adjustable in said throat and solely supporting said boring means in correct axial alignment, said bearing element and said boring means being provided with cooperating interengaging means for moving said boring means axially of said bearing element as said boring means is rotated.

9. In a boring mechanism, a frame having a throat, and boring means, in combination with a bearing element axially adjustable in said throat and solely supporting said boring means in correct axial alignment, and means for locking said bearing element in adjusted position in said throat, said bearing element and said boring means being provided with cooperating means for feeding said boring means axially of said bearing element as said boring means is rotated.

10. In a boring mechanism, a frame formed with a throat, boring means, supporting means therefor, and means for holding a work piece to said frame in desired position, in combination with a plurality of abutment plates mounted on said frame and adapted to extend across said throat and adapted to be moved with relation thereto and to each other to provide an adjustable backing for a wide range of sizes of work pieces.

11. In a boring mechanism, a frame formed with a throat, boring means, supporting means therefor, and means for holding a work piece to said frame in desired position, in combination with a pair of abutment plates pivotally mounted at their respective upper ends to said plate and adapted to swing toward each other by gravity so as to extend across said throat and adapted to be moved with relation thereto and to each other to provide an adjustable backing for a wide range of sizes of work pieces.

12. In a boring mechanism, a frame formed with a throat, boring means, supporting means therefor, and means for holding a work piece to said frame in desired position, in combination with a plurality of abutment plates mounted on said frame and adapted to extend across said throat and adapted to be moved with relation thereto and to each other to provide an adjustable backing for a wide range of sizes of work pieces, and a removable plate snugly slidably fitting upon said boring means and adapted to be moved axially thereof into engagement with the outer end of a bearing of the work piece to determine if the work piece is properly centered and aligned.

In testimony whereof, I have signed my name to this specification at Lititz, Pennsylvania, this 12th day of November, 1925.

HARRY C. NYE.